United States Patent
Bryant

(10) Patent No.: US 10,667,966 B2
(45) Date of Patent: Jun. 2, 2020

(54) VEHICLE FLOOR LIFT

(71) Applicant: GM Global Technology Operations LLC, Detroit, MI (US)

(72) Inventor: Wade W. Bryant, Grosse Pointe Farms, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/014,452

(22) Filed: Jun. 21, 2018

(65) Prior Publication Data

US 2019/0388287 A1 Dec. 26, 2019

(51) Int. Cl.
*A61G 3/06* (2006.01)
*B60P 1/43* (2006.01)

(52) U.S. Cl.
CPC .............. *A61G 3/067* (2016.11); *A61G 3/062* (2013.01); *B60P 1/43* (2013.01)

(58) Field of Classification Search
CPC .................................. B60P 1/44; A61G 3/067
USPC ........................................................... 414/537
See application file for complete search history.

(56) References Cited

U.S. PATENT DOCUMENTS 4,479,753 A * 10/1984 Thorley .................. A61G 3/06
187/243

* cited by examiner

*Primary Examiner* — Saul Rodriguez
*Assistant Examiner* — Willie Berry, Jr.

(57) ABSTRACT

A floor lift system includes a stationary floor assembly and a translational floor assembly. The stationary floor assembly includes a base, a plurality of motors, and a rail system. The base is secured to a floor of the vehicle. The translational floor assembly includes a tray assembly and a floor lift assembly. A first of the plurality of motors moves the translational floor assembly horizontally from a stowed position out of a door of the vehicle to an extended position. A second of the plurality of motors moves the floor lift assembly horizontally out of the tray assembly. A third of the plurality of motors lowers the floor lift assembly.

17 Claims, 4 Drawing Sheets

VEHICLE FLOOR LIFT

INTRODUCTION

The present disclosure relates generally to passenger vehicle accessibility and more particularly to vehicle access for wheelchairs.

Currently, wheelchair accessibility to vehicles includes ramps and lift systems that require major modifications to the floor or chassis of the vehicle. Additionally, once stowed, the systems require an excessive amount of interior vehicle space requiring larger vehicles to maintain the same amount of usable space as smaller vehicles without accessibility systems. The size and weight of these systems add to the weight of the vehicle, thus decreasing fuel mileage and vehicle life. Furthermore, the long cycle time required to extend and retract these systems reduce the enjoyment of having a vehicle and accessibility to the vehicle.

Accordingly, there is a need in the art for improved vehicle floor lift system having a smaller stowage space, better cycle time, improved ease of installation, and lower weight for fuel economy savings and extended vehicle life.

SUMMARY

The present disclosure includes a floor lift system for a vehicle. The floor lift system includes a stationary floor assembly and a translational floor assembly. The stationary floor assembly includes a base, a plurality of motors, and a rail system. The base is secured to a floor of the vehicle. The translational floor assembly includes a tray assembly and a floor lift assembly. A first of the plurality of motors moves the translational floor assembly horizontally from a stowed position out of a door of the vehicle to an extended position. A second of the plurality of motors moves the floor lift assembly horizontally out of the tray assembly. A third of the plurality of motors lowers the floor lift assembly.

In one example of the present disclosure, the tray assembly of the translational floor assembly includes a tray frame and a first and second frame rails. The first and second frame rails are supported for translational movement by the rail system of the stationary floor assembly.

In another example of the present disclosure, the lift floor assembly includes a lift floor frame having a first and second side rails. The first side rail is disposed inside the first frame rail of the tray frame. The second side rail is disposed inside the second frame rail of the tray frame. Each of the first and second side rails includes a screw drive gear that selectively engages with second of the plurality of motors.

In yet another example of the present disclosure, the first and second side rails of the lift floor frame each includes a floor latch assembly. Each of the floor latch assemblies include a latch solenoid and a cable guide. The latch solenoid selectively retains the floor lift assembly in a stowed position.

In yet another example of the present disclosure, the lift floor assembly further includes a lift floor, a tread floor support, a first corner floor support, and a second corner floor support. The tread floor support includes a top edge and a bottom edge. The top edge is rotatably supported by the first and second side rails. The bottom edge includes a first hinge which is rotatably attached to the lift floor.

In yet another example of the present disclosure, the floor lift system further includes a cable having a first end connected to the third of the plurality of motors, a second end connected to an end of the first hinge of the tread floor support, and passes through the cable guide of the floor latch assembly.

In yet another example of the present disclosure, the floor latch assembly further includes a rechargeable battery providing power to the latch solenoid.

In yet another example of the present disclosure, the stationary floor assembly further includes a charging terminal and the rechargeable battery of the floor latch assembly electrically connects with the charging terminal when the translational floor assembly is in the stowed position.

In yet another example of the present disclosure, the lift floor assembly further includes an end ramp and a ramp motor. The end ramp is connected to a leading edge of the lift floor via a second hinge. The ramp motor flips the end ramp to an extended position when the lift floor assembly is in a lowered position.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

Figure 1:
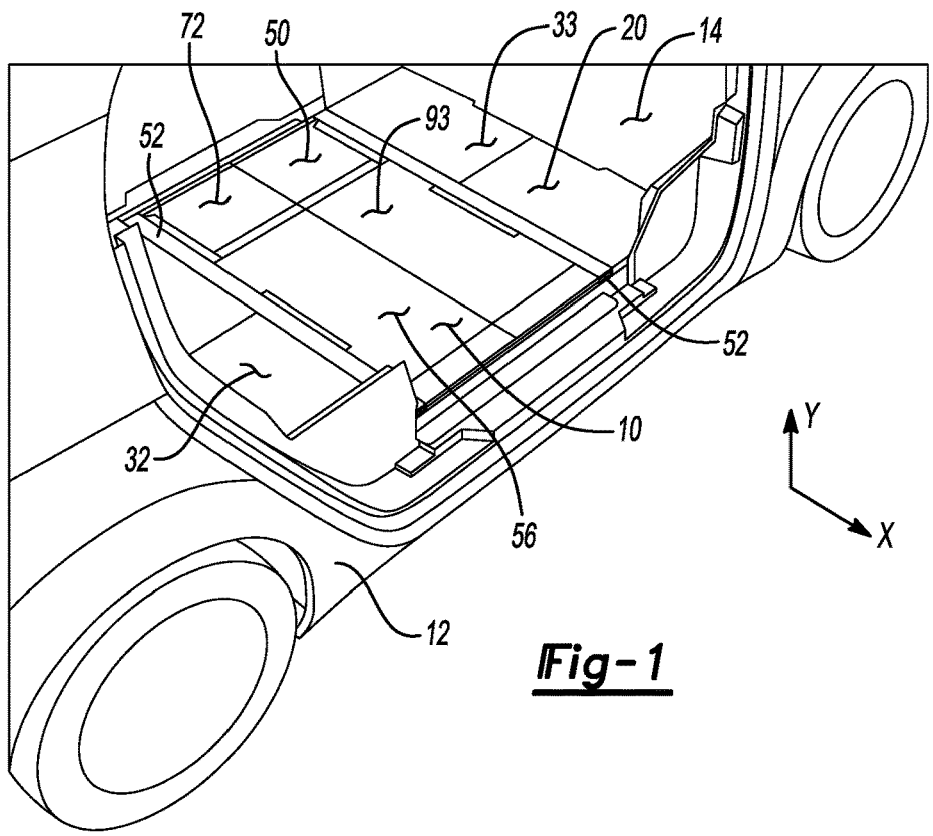
FIG. 1 is a perspective view of a vehicle lift floor system according to the principles of the present disclosure.
Figure 2:
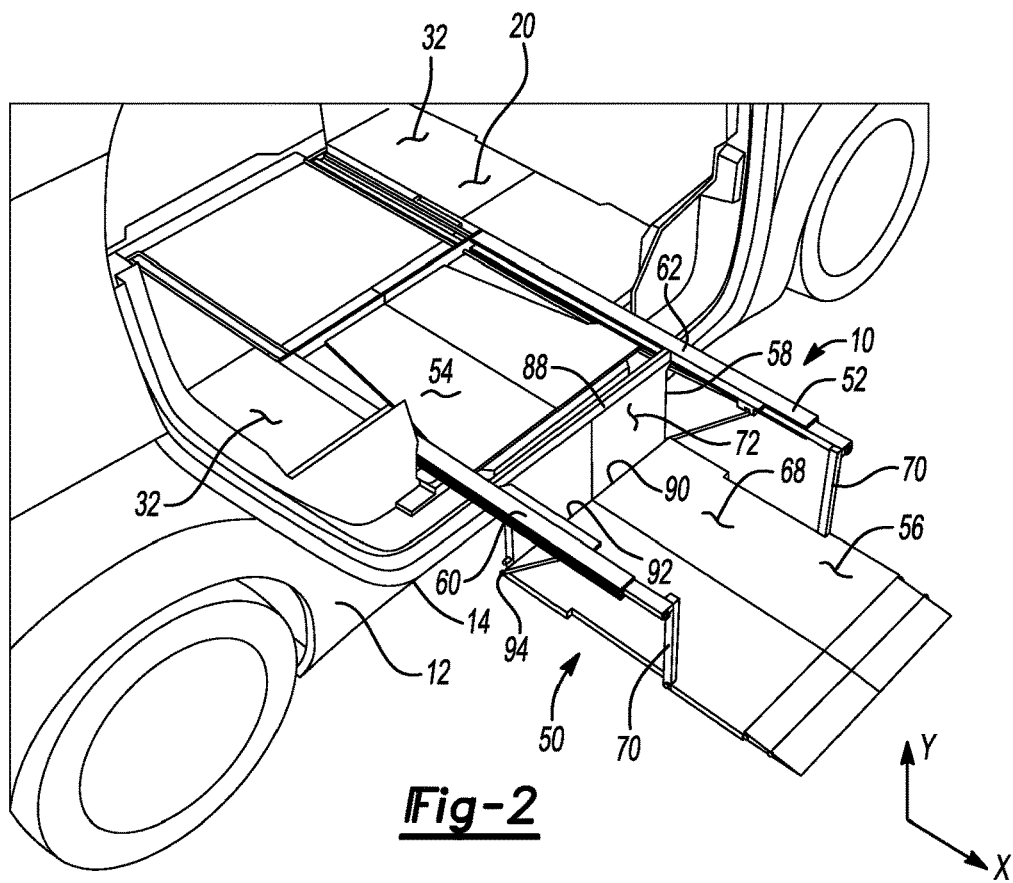
FIG. 2 is a perspective view of a vehicle lift floor system according to the principles of the present disclosure.

Referring to the drawings, wherein like reference numbers refer to like components, in FIGS. 1 and 2 a floor lift system 10 for a vehicle 12 is illustrated and will now be described. The floor lift system 10 is installed and fixed to the floor 14 or frame of the vehicle 12 and is capable of automatically moving between a stowed position (FIG. 1) and an extended position (FIG. 2). When in the stowed position, the total height of the floor lift system 10 is approximately 50 mm. As a result, very little vehicle 12 space is required by floor lift system 10 and nearly any type of vehicle 12 can have the floor lift system 10 installed.

Figure 3:
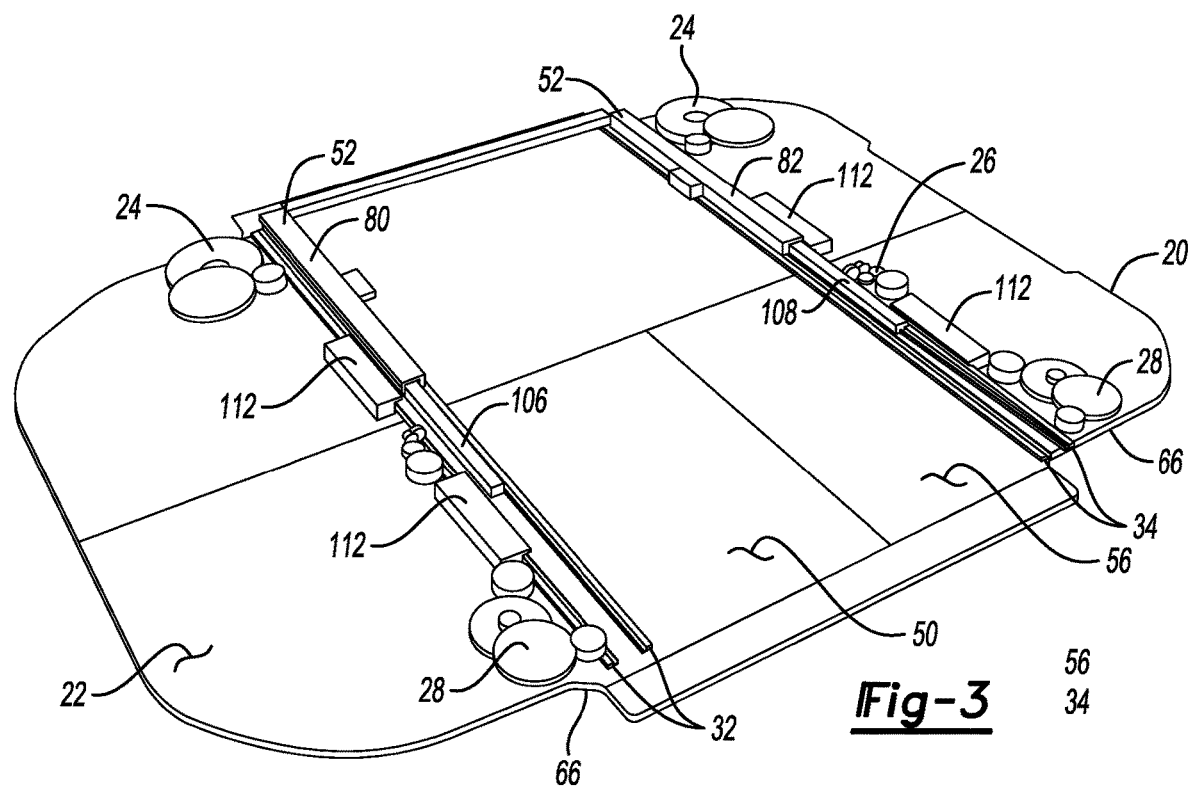
FIG. 3 is a perspective cut-away view of a vehicle lift floor system according to the principles of the present disclosure.

Turning now to FIG. 3 with continued reference to FIGS. 1 and 2, the subsystems and subassemblies of the floor lift system 10 will now be described. For example, the floor lift system 10 includes a stationary floor assembly 20 and a translational floor assembly 50. The stationary floor assembly 20 is the portion of the floor lift system 10 that functions to retain the floor lift system 10 to the vehicle 12 while essentially housing the translational floor assembly 50. The stationary floor assembly 20 includes a base 22, a pair of cable motors 24, a pair of screw motors 26, a pair of tray motors 28, a rail system 30, and a top floor 33. The base 22 provides a platform for the remainder of the stationary floor assembly 20. More particularly, the cable motors 24, screw motors 26, tray motors 28, and rail system 30 are mounted to the base 22. The rail system 30 includes a first and second rails 32, 34 which bears the load of the translational floor assembly 50 and allows the translational floor assembly 50 to travel between the stowed and extended positions with relatively low amounts of friction between the translational floor assembly 50 and the stationary floor assembly 20.

The cable motors 24, screw motors 26, and tray motors 28 coordinate to move the translational floor assembly 50 from the stowed position to the extended positon. This is accomplished as each of the motors 24, 26, 28 is designated to move one of the subassemblies of the translational floor assembly 50. The subassemblies of the translational floor assembly 50 include a tray assembly 54 and a lift floor assembly 56. The screw motors 26 translate the lift floor assembly 56 in and out of the tray assembly 54. The tray motors 28 moves the tray assembly 54 in and out of the stationary floor assembly 20. The cable motors 24 raise and lower the lift floor assembly 56 after the lift floor assembly 56 has been translated out of the tray assembly 54. While the functions of the individual pairs of motors 24, 26, 28 are now defined, the specifics of how the motors 24, 26, 28 are described in more detail below.

Figure 4:
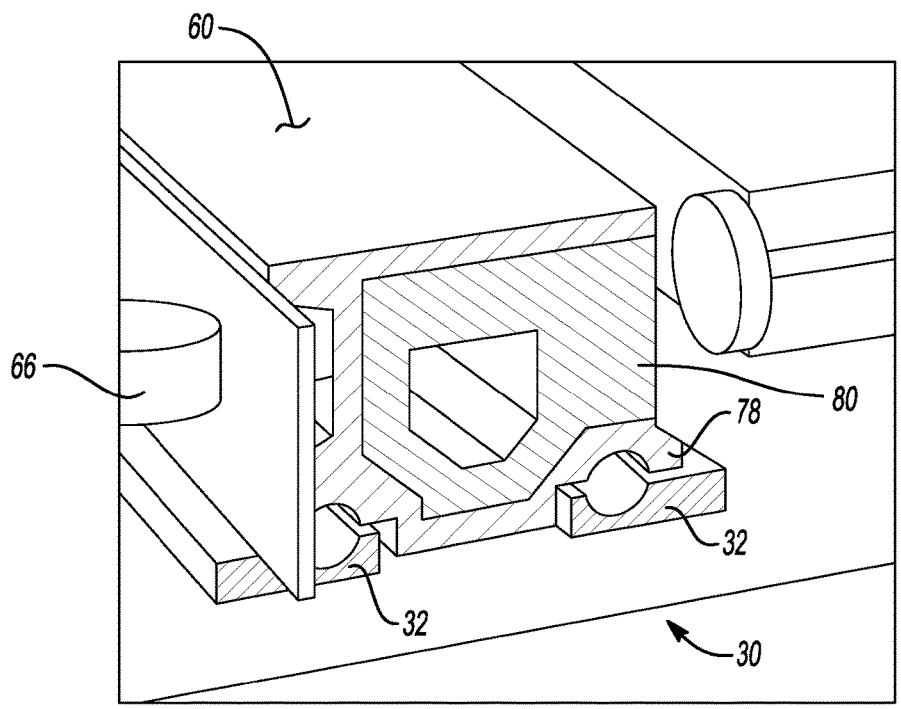
FIG. 4 is a perspective view of a portion of a vehicle lift floor system according to the principles of the present disclosure.
Figure 5:
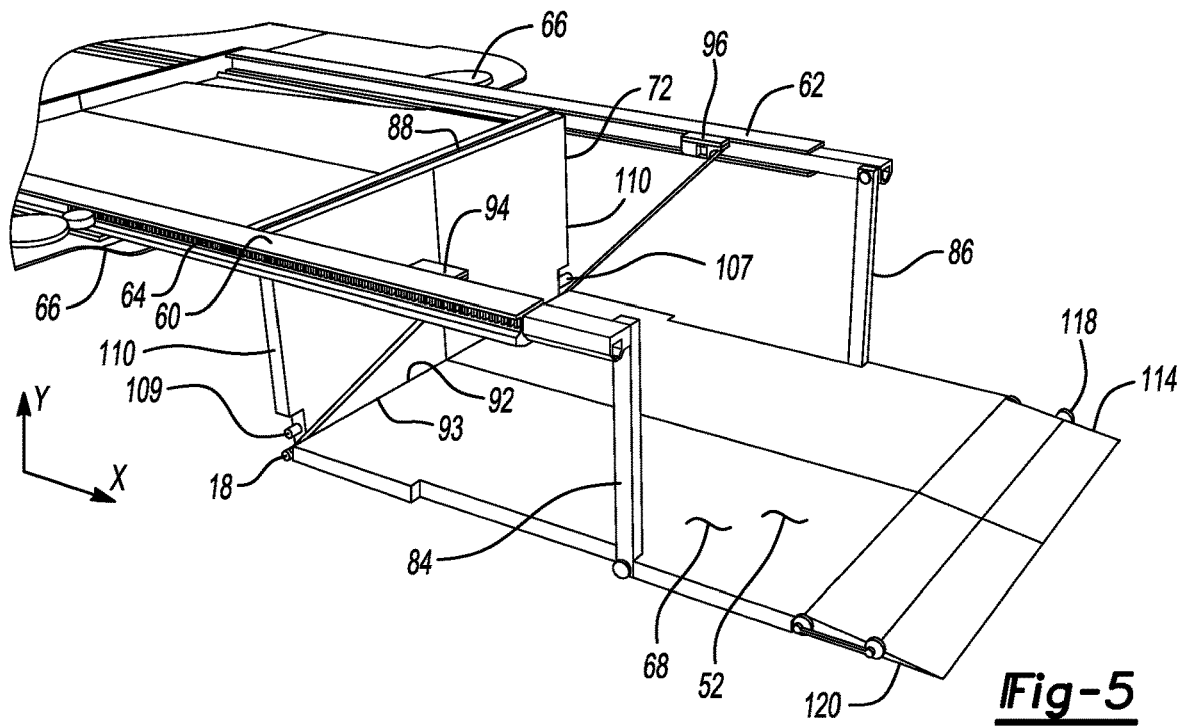
FIG. 5 is a perspective view of a portion of a vehicle lift floor system according to the principles of the present disclosure.

Turning now to FIG. 4 with continuing reference to FIGS. 1-3, a detailed view of a portion of the tray assembly 54 is illustrated and will now be described. The tray assembly 54 includes a tray frame 58, a first frame rail 60, and a second frame rail 62. The frame rails 60, 62 are mounted on opposite sides of the tray frame 58 and are supported for translational movement by the first and second rails 32, 34 of the stationary floor assembly 20. The frame rails 60, 62 include gear teeth 64 (shown in more detail in FIG. 5) that engage with a gear wheel 66 of the tray motor 28. In this manner, the tray motor 28 is able to move the tray assembly 54 in and out of the stationary floor assembly 20. A pair of retention brackets 112 are fixed to the base 22 of the stationary floor assembly 20 proximate to each of the frame rails 60, 62 such that the frame rails 60, 62 are restrained from movement in the Y direction yet are allowed to move freely in the X direction.

Figure 6:
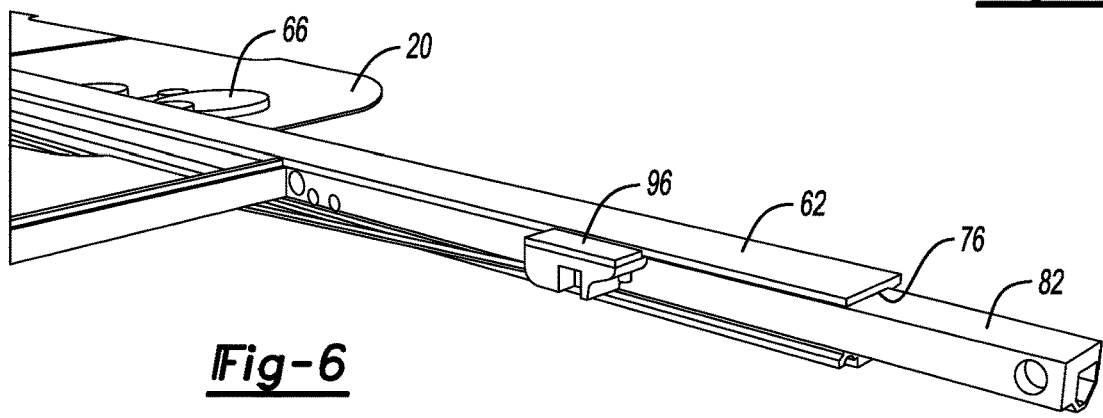
FIG. 6 is a perspective view of a portion of a vehicle lift floor system according to the principles of the present disclosure.
Figure 7:
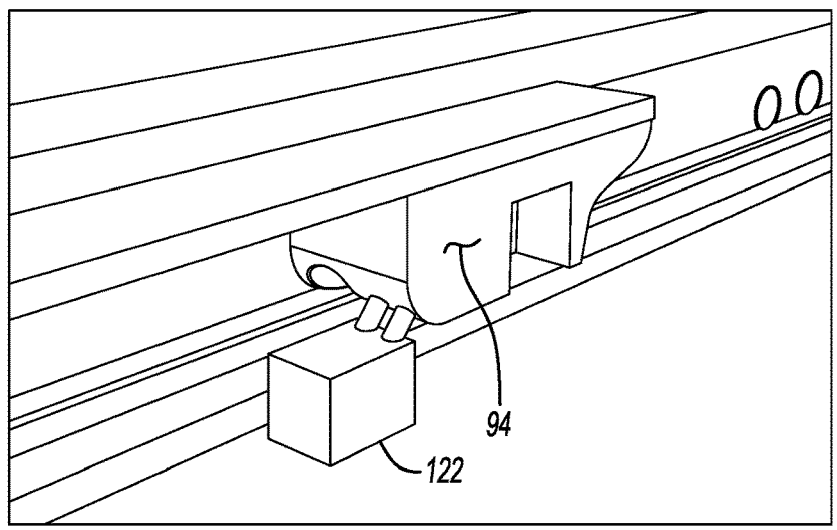
FIG. 7 is a perspective view of a portion of a vehicle lift floor system according to the principles of the present disclosure.
Figure 8:
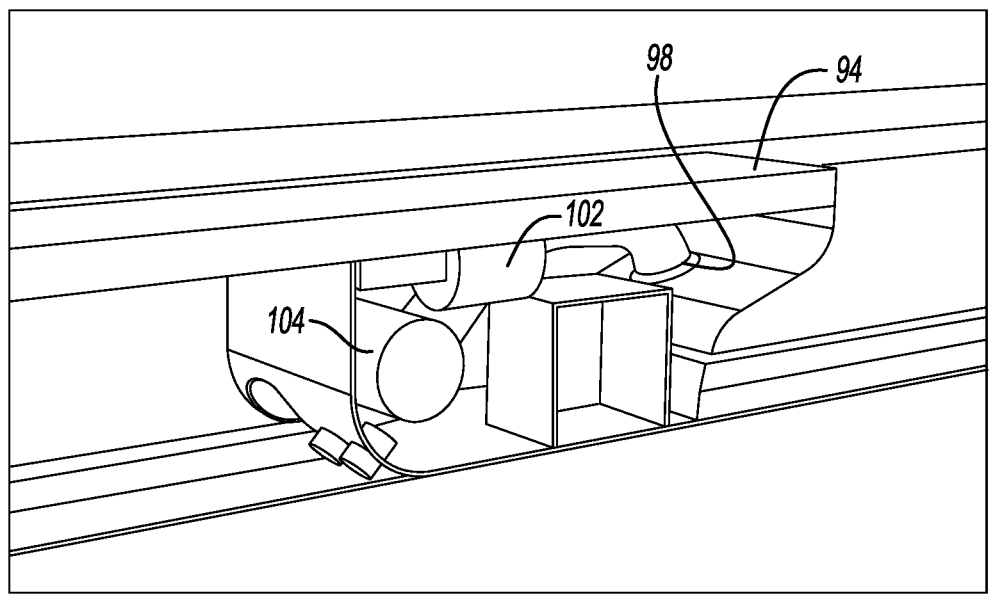
FIG. 8 is a perspective view of a portion of a vehicle lift floor system according to the principles of the present disclosure.

The frame rails 60, 62 extend in the outboard direction X from the tray frame 58 and have a cross-sectional shape forming a channel 76 having an open side 78. In this manner, the lift floor assembly 56 includes a lift floor 68, a first and second corner floor supports 84, 86, a tread floor support 72, a lift floor frame 74, and a stowable ramp 114. The lift floor frame 74 includes a first side rail 80 and a second side rail 82. The first side rail 80 of the lift floor frame 74 is disposed in the channel 76 of the first frame rail 60 of the tray frame 58. Likewise, the second side rail 82 is disposed in the channel 76 of the second frame rail 62 of the tray frame 58 (shown in FIG. 6). The first and second side rails 80, 82 are free to move in the X direction with respect to the frame rails 60, 62 of the tray frame 58.

In supporting the lift floor 68 from the first and second side rails 80, 82, the first and second corner floor supports 84, 86 each have a first end that is rotatably supported by the end of the first and second side rails 80, 82, respectively. Likewise, the tread floor support 72 has a top edge 88, a bottom edge 90, and two side edges 110. The top edge 88 is rotatably supported by the first and second side rails 80, 82. The bottom edge 90 includes a hinge 92 which is rotatably attached to a trailing edge 93 of the lift floor 68. The end ramp 114 is rotatably attached with a hinge 116 to the leading edge 118 of the lift floor assembly 56. A ramp motor 120 attached to the lift floor 68 flips the ramp 114 from a stowed position to an extended position when the lift floor assembly 56 is in the lowered position.

Figure 9:
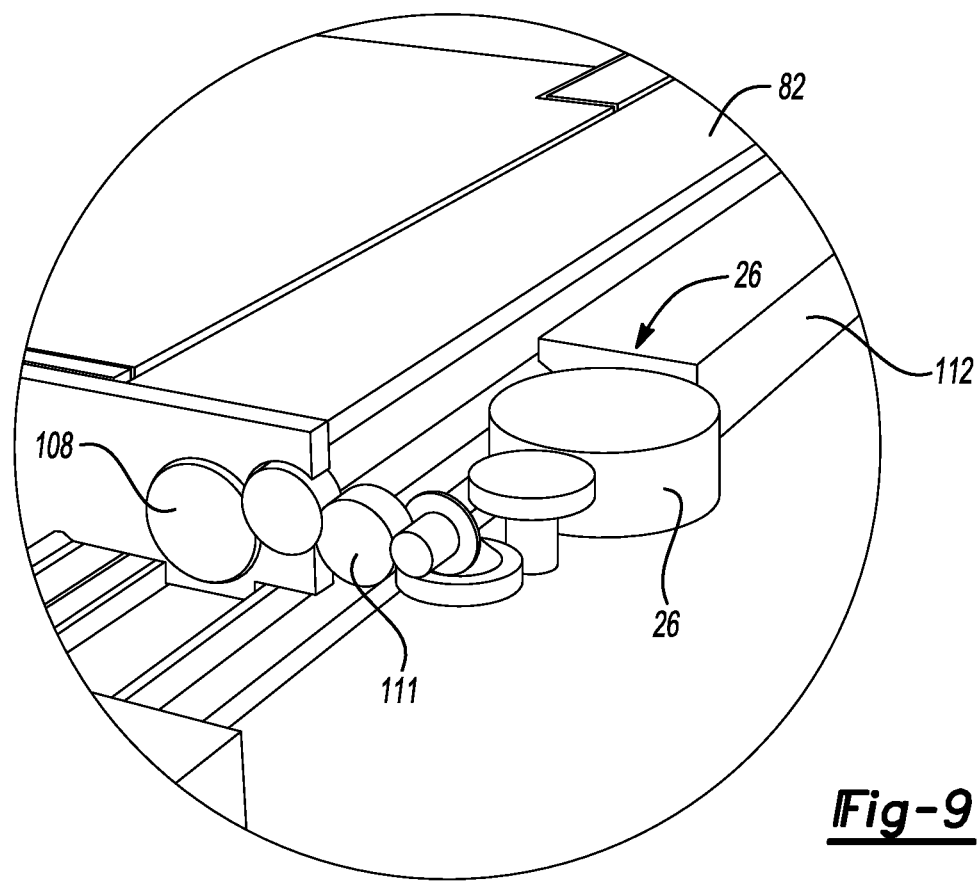
FIG. 9 is a perspective view of a portion of a vehicle lift floor system according to the principles of the present disclosure.

In order to facilitate the movement of the side rails 80, 82 and the lowering of the lift floor 68, each of the first and second side rails 80, 82 of the lift floor frame 74 include both a screw drive gear 106, 108 and a floor latch assembly 94, 96. The screw drive gear 106, 108, as shown in FIG. 9, is rotationally supported by the first and second side rails 80, 82 respectively. The screw motors 26 include a gear 111 that engages the screw drive gear 106, 108 to laterally translate the side rails 80, 82 at least partially out of the ends of the frame rails 60, 62.

Having a latch solenoid 102, a cable guide 98, and a rechargeable battery 104, the floor latch assemblies 94, 96 are capable of performing two functions. First, the floor latch assemblies 94, 96 selectively retain and release the lift floor 68 proximate the hinge 92. More particularly, the latch solenoid 102 is powered by the rechargeable battery 104 to retain and release a pin 107 extending from each of the side edges 110 of the tread floor support 72. When the translational floor assembly 50 is in the stowed position the rechargeable battery 104 is in connection with a charging terminal 122 which is disposed on the base 22 of the stationary floor assembly 20.

The second function of the floor latch assemblies 94, 96 includes acting as a pivot point for a cable 100. The cable 100 passes through the cable guide 98 and has a first end attached to the end of the hinge 92 proximate to the pin 107 and a second end that connects to the cable motor 24. As the cable motor 24 retracts and extends the cable 100, the cable 100 pulls on the translational floor assembly 50 such that the tread floor support 72 and the lift floor 68 are horizontal and flat relative to each other.

The order of operation of the floor lift system 10 begins with the floor lift system 10 in the stowed position. With the door of the vehicle 12 open, the tray motors 28 operate to move the tray assembly 54, and lift floor assembly 56 of the translational floor assembly 50 out of the vehicle 12. Once the translational floor assembly 50 is extended, the screw motors 26 engage the screw drive gears 106, 108 of the lift floor frame 74 and further extend the lift floor frame 74 and the lift floor assembly 56 out of the vehicle 12. Next, the floor latch assemblies 94, 96 release the pins 109 of the tread floor support 72 and the cable motors 24 release the cable 100 in a controlled manner to drop the lift floor 68 to the ground outside of the vehicle 12. Finally, the ramp motor 120 flips the ramp 114 to the extended position. Returning to the stowed position requires the operation run in reverse.

While examples have been described in detail, those familiar with the art to which this disclosure relates will recognize various alternative designs and examples for practicing the disclosed method within the scope of the appended claims.

The following is claimed:

1. A floor lift system for a vehicle, the floor lift system comprising:
   a stationary floor assembly comprising a base, a plurality of motors, and a rail system, and wherein the base is secured to a floor of the vehicle; and
   a translational floor assembly comprising a tray assembly and a floor lift assembly, and wherein a first of the plurality of motors moves the translational floor assembly horizontally from a stowed position out of a door of the vehicle to an extended position, a second of the plurality of motors moves the floor lift assembly horizontally out of the tray assembly, and a third of the plurality of motors lowers the floor lift assembly;
   wherein the tray assembly of the translational floor assembly further comprises a tray frame and a first frame rail and a second frame rail and the first and the second frame rails are supported for translational movement by the rail system of the stationary floor assembly,
   wherein the lift floor assembly further comprises a lift floor frame having a first side rail and a second side rail, the first side rail is disposed inside the first frame rail of the tray frame, the second side rail is disposed inside the second frame rail of the tray frame, and each of the first and the second side rails comprises a screw drive gear that selectively engages with the second of the plurality of motors, and
   wherein the first and the second side rails of the lift floor frame each comprise a floor latch assembly, each of the floor latch assemblies comprising a latch solenoid and a cable guide, and the latch solenoid selectively retains the floor lift assembly in a stowed position.

2. The floor lift system of claim 1 wherein the lift floor assembly further comprises a lift floor, a tread floor support, a first corner floor support, and a second corner floor support, the tread floor support comprising a top edge and a bottom edge, wherein the top edge is rotatably supported by the first and second side rails, and the bottom edge includes a first hinge which is rotatably attached to the lift floor.

3. The floor lift system of claim 2 wherein the floor lift system further comprises a cable having a first end connected to the third of the plurality of motors and a second end connected to an end of the first hinge of the tread floor support, and wherein the cable passes through the cable guide of the floor latch assembly.

4. The floor lift system of claim 3 wherein the floor latch assembly further comprises a rechargeable battery providing power to the latch solenoid.

5. The floor lift system of claim 4 wherein the stationary floor assembly further comprises a charging terminal and the rechargeable battery of the floor latch assembly electrically connects with the charging terminal when the translational floor assembly is in the stowed position.

6. The floor lift system of claim 5 wherein the lift floor assembly further comprises an end ramp and a ramp motor, wherein the end ramp is connected to a leading edge of the lift floor via a second hinge, and the ramp motor flips the end ramp to an extended position when the lift floor assembly is in a lowered position.

7. A floor lift system for a vehicle, the floor lift system comprising:
   a stationary floor assembly comprising a base, a cable motor, a screw motor, a tray motor, and a rail system, and wherein the base is secured to a floor of the vehicle; and
   a translational floor assembly comprising a tray assembly and a floor lift assembly, and wherein the tray motor moves the translational floor assembly horizontally from a stowed position out of a door of the vehicle to an extended position, the screw motor moves the floor lift assembly horizontally out of the tray assembly, the cable motor lowers the floor lift assembly, the translational floor assembly comprises a tray frame and a first frame rail and a second frame rail, and the first and the second frame rails are supported for translational movement by the rail system of the stationary floor assembly.

8. The floor lift system of claim 7 wherein the lift floor assembly comprises a lift floor frame having a first side rail and a second side rail, the first side rail is disposed inside the first frame rail of the tray frame, the second side rail is disposed inside the second frame rail of the tray frame, and each of the first and the second side rails include a screw drive gear that selectively engages with the screw motor.

9. The floor lift system of claim 8 wherein the first and the second side rails of the lift floor frame each comprise a floor latch assembly, each of the floor latch assemblies comprising a latch solenoid and a cable guide, and the latch solenoid selectively retains the floor lift assembly in a stowed position.

10. The floor lift system of claim 9 wherein the lift floor assembly further comprises a lift floor, a tread floor support, a first corner floor support, and a second corner floor support, the tread floor support having a top edge and a bottom edge, the top edge rotatably supported by the first and second side rails, and the bottom edge having a first hinge which is rotatably attached to the lift floor.

11. The floor lift system of claim 10 wherein the floor lift system further comprises a cable having a first end connected to the cable motor, a second end connected to an end of the first hinge of the tread floor support, and wherein the cable passes through the cable guide of the floor latch assembly.

12. The floor lift system of claim 11 wherein the floor latch assembly further comprises a rechargeable battery providing power to the latch solenoid.

13. The floor lift system of claim 12 wherein the stationary floor assembly further comprises a charging terminal and the rechargeable battery of the floor latch assembly electrically connects with the charging terminal when the translational floor assembly is in the stowed position.

14. The floor lift system of claim 13 wherein the lift floor assembly further comprises an end ramp and a ramp motor, and wherein the end ramp is connected to a leading edge of the lift floor via a second hinge, and the ramp motor flips the end ramp to an extended position when the lift floor assembly is in a lowered position.

15. The floor lift system of claim 12 wherein the stationary floor assembly further comprises a charging terminal and the rechargeable battery of the floor latch assembly electrically connects with the charging terminal when the translational floor assembly is in the stowed position.

16. A floor lift system for a vehicle, the floor lift system comprising:
   a stationary floor assembly comprising a base, a cable motor, a screw motor, a tray motor, and a rail system, and wherein the base is secured to a floor of the vehicle; and
   a translational floor assembly comprising:
      a tray assembly comprising a tray frame and a first frame rail and a second frame rail, and wherein the first and the second frame rails are supported for translational movement by the rail system of the stationary floor assembly; and a floor lift assembly comprising a lift floor frame, a lift floor, a tread floor support, a first corner floor support, and a second corner floor support, and wherein the lift floor frame includes a first side rail and a second side rail, wherein the first side rail is disposed inside the first frame rail of the tray frame, the second side rail is disposed inside the second frame rail of the tray frame, and each of the first and the second side rails include a screw drive gear and a floor latch assembly, wherein the screw drive gear selectively engages with the screw motor, and each of the floor latch assemblies comprise a latch solenoid, a rechargeable battery, and a cable guide, wherein the latch solenoid selectively retains the floor lift assembly in a stowed position, the rechargeable battery provides power to the latch solenoid, and wherein the tread floor support includes a top edge and a bottom edge, the top edge of the tread floor support is rotatably supported by the first and second side rails, and the bottom edge of the tread floor support comprising a first hinge which is rotatably attached to the lift floor; and wherein the tray motor moves the translational floor assembly horizontally from a stowed position out of a door of the vehicle to an extended position, the screw motor moves the floor lift assembly horizontally out of the tray assembly, the cable motor lowers the floor lift assembly, the lift floor assembly further comprising an end ramp and a ramp motor, wherein the end ramp is connected to a leading edge of the lift floor via a second hinge, and the ramp motor flips the end ramp to an extended position when the lift floor assembly is in a lowered position.

17. The floor lift system of claim 16 wherein the floor lift system further comprises a cable having a first end connected to the cable motor, a second end connected to an end of the first hinge of the tread floor support, and wherein the cable passes through the cable guide of the floor latch assembly.

\* \* \* \* \*